Aug. 15, 1939.  E. SHURTS  2,169,992
MILKING MACHINE
Filed Oct. 24, 1938  3 Sheets-Sheet 1
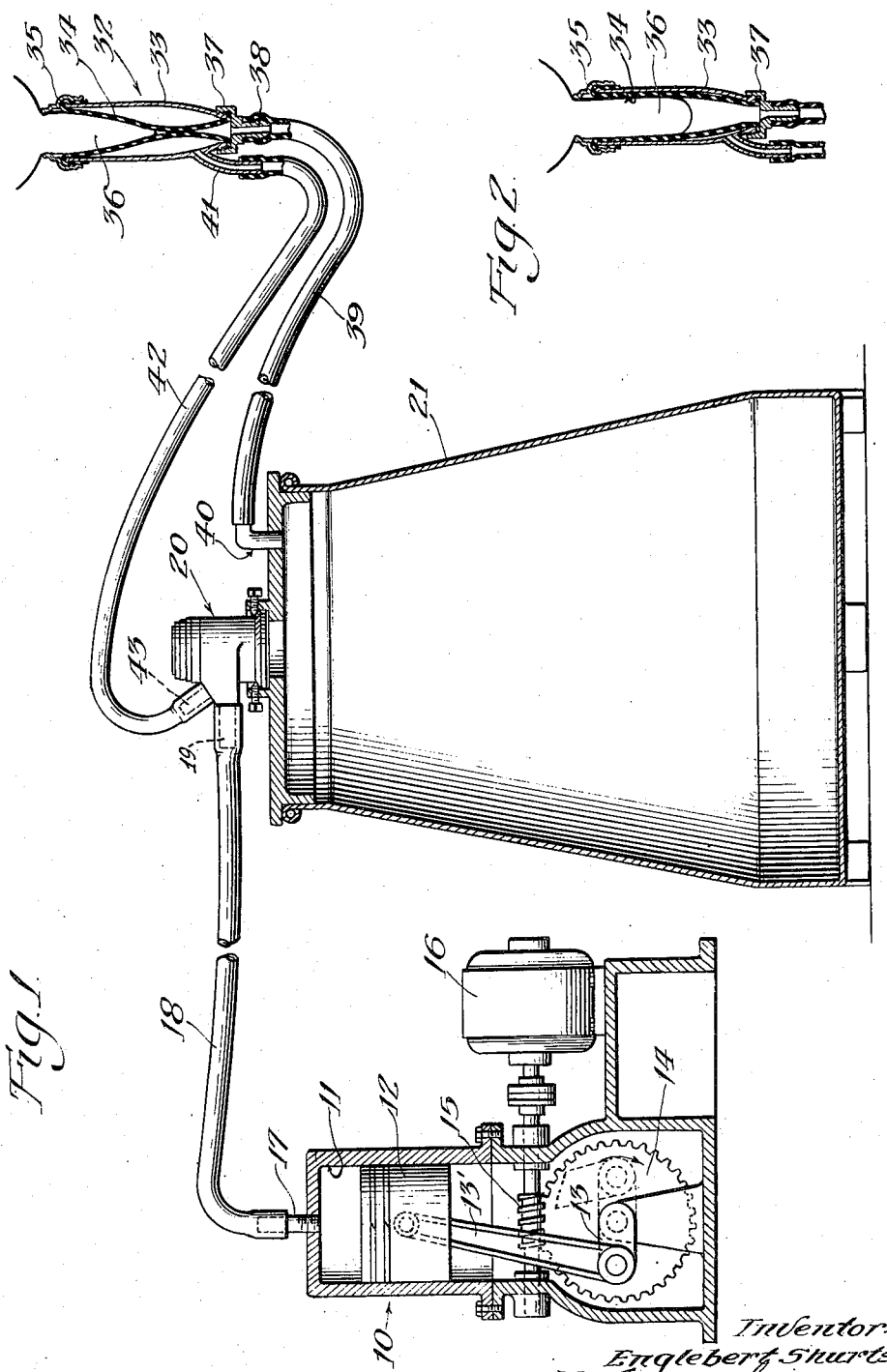

Aug. 15, 1939.　　　　E. SHURTS　　　　2,169,992
MILKING MACHINE
Filed Oct. 24, 1938　　　3 Sheets-Sheet 2
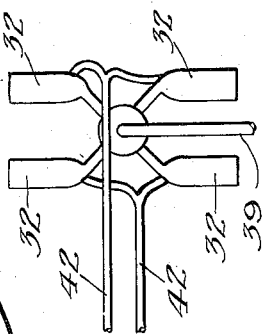
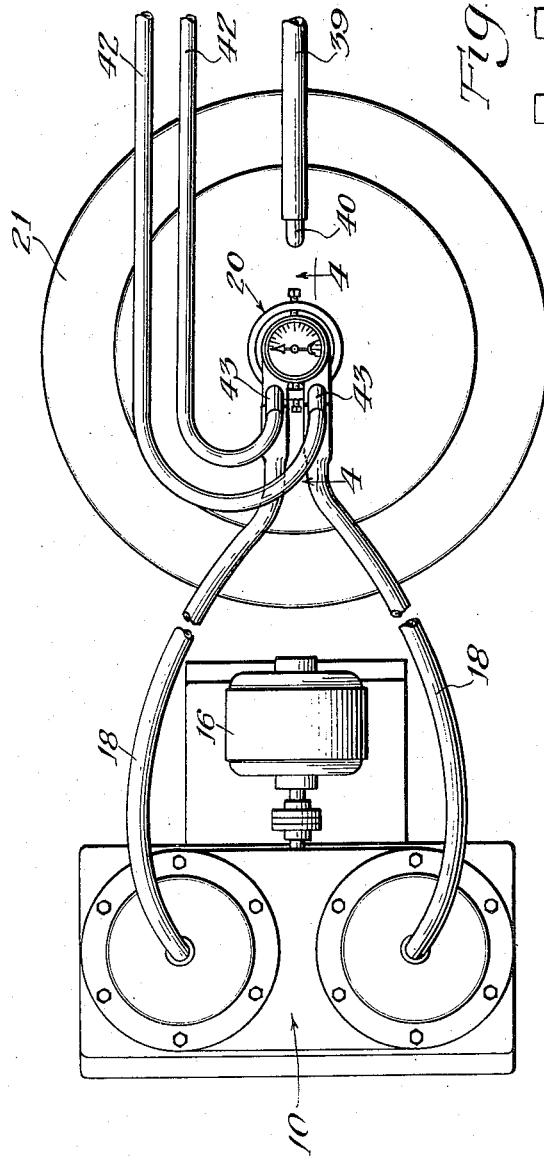
Inventor:
Englebert Shurts,
By Eugene M. Simpson
Attorney

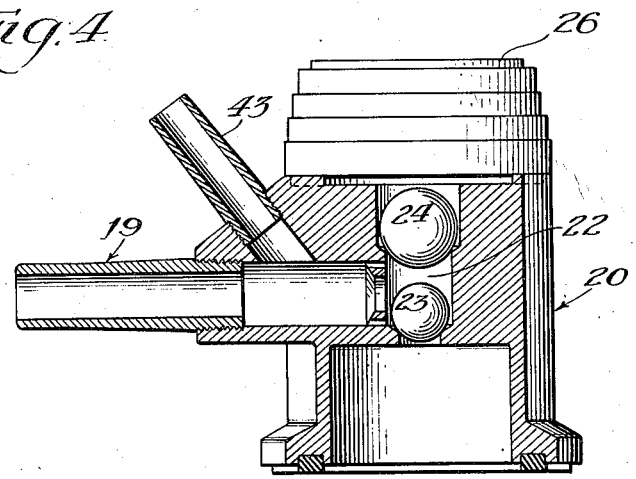
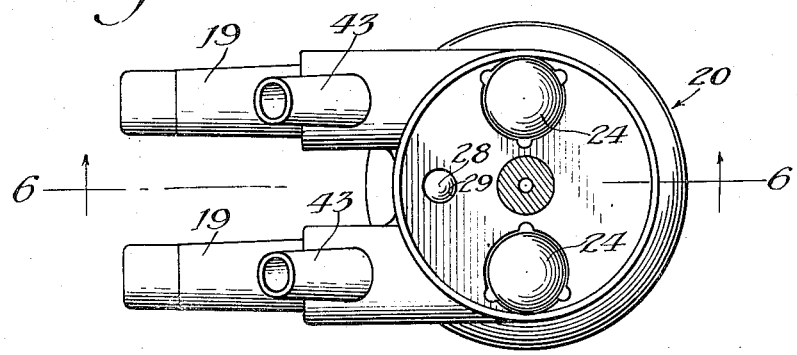
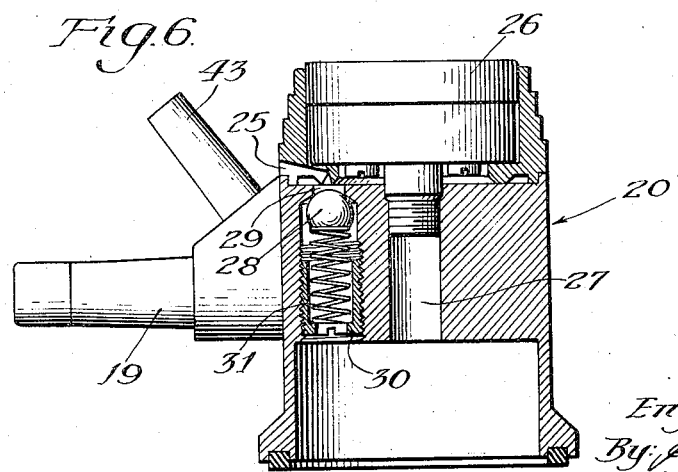

Patented Aug. 15, 1939

2,169,992

UNITED STATES PATENT OFFICE 2,169,992

MILKING MACHINE

Englebert Shurts, Waukesha, Wis.

Application October 24, 1938, Serial No. 236,601

6 Claims. (Cl. 31—61)

This invention relates to milking machines, and more particularly to a milking machine employing a multiple cylinder reciprocating piston pump.

One object of the present invention is to produce a milking machine having a multiple cylinder reciprocating pump which will increase the speed of milking without injury to the animal.

A further object is to produce a milking machine which is readily transported and easily cleaned.

A further object is to produce a milking machine for use with double acting teat cups and having a multiple cylinder pump, which machine will be simpler and more readily constructed than those now on the market.

Another object is to produce a simplified and improved control mechanism for milking machines.

Other objects will become apparent from the following description.

According to the present invention, a plurality of double acting teat cups, each cup comprising a rigid casing with a flexible liner therein, are attached to the teats of an animal, while a multiple cylinder pump is so connected with a milk receiving can and the teat cups as to effect alternate milking of the teats.

In the drawings:

Fig. 1 is an elevational view, partly in cross-section, showing a milking machine embodying the present invention with the teat cup in place on the teat of the animal, and during the upward or pressure stroke of the pump piston;

Fig. 2 is a view of the teat cup and teat during the suction or downward stroke of the pump piston;

Fig. 3 is a plan view of the milking machine shown in Fig. 1;

Fig. 4 is a cross-sectional elevational view of the controller for the milking machine, showing the valve arrangement;

Fig. 5 is a plan view of the controller shown in Fig. 4 with the pressure gage removed;

Fig. 6 is a cross-section on the line 6—6 of Fig. 5, looking in the direction of the arrows, and Fig. 7 is a plan view of four teat cups showing their connection to the remainder of the milking machine.

Referring to the drawings, in which like numerals indicate like parts throughout the several views, the milking machine is operated by a reciprocating twin cylinder pump 10, having cylinders 11 in which pistons 12 (one of which is shown) operate. Each of the pistons is driven by a piston rod 12' and a crank 13. The crank 13 is rotated by a worm wheel 14 which is driven by a worm 15 from a motor 16 mounted adjacent the pump 10.

A port in the top of each cylinder 11 contains a nipple 17 to which is connected a tubing or hose 18. The opposite end of the hose 18 is connected to a nipple 19 fixed in a controller generally designated 20, which is mounted on top of a milk can 21 and is shown in detail in Figures 4, 5 and 6.

Referring to Figures 4, 5 and 6, it will be seen that the nipple 19 leads into a valve chamber 22 which contains an intake valve 23 for the pump and an exhaust valve 24. The intake valve 23 opens inwardly from the interior of the milk can 21 so that the pump 10 withdraws air from the interior of the milk can, and expels it through the exhaust valve 24 in the top of the controller 20. The air so expelled escapes from the top of the controller 20 through a port 25 in the side of the controller.

A pressure gage 26 is mounted in a port 27 leading to the interior of the milk can 21, and is adapted to register the amount of pressure below atmospheric in inches of mercury.

A spring pressed pressure relief valve 28 controls the flow of air through a port 29 in the controller 20 and is adapted to open when the pressure within the milk can 21 reaches a predetermined desirable minimum. This desirable pressure can be varied to suit the animal by suitably adjusting a cup screw 30 which retains the bottom of the spring 31 which maintains the valve on its seat.

Referring again to Fig. 1, the teat cups, which are generally designated 32 and are of the type known as "double acting teat cups," each comprises a metal casing 33 and a flexible liner 34 preferably made of soft rubber. A metal cap 35 provided with a central aperture retains the upper end of the liner in place in the casing, while permitting the teat 36 to be inserted into the interior of the liner through the aperture.

A cap 37 is secured over the lower end of the teat cup and retains the lower end of the liner in the casing. The cap 37 has a nipple 38 formed thereon which opens into the interior of the liner. A hose or tubing 39 is secured over the nipple 38 and connects with an elbow 40 leading into the interior of the milk can 21.

A tubular inlet 41 is formed on the metal casing 33, and opens into the space between the casing and the liner 34. A hose or tubing 42 is connected between the tubing 41 and a nipple 43 on the controller 20.

The nipple 43 opens into the chamber 22 of the controller so that both suction and pressure are transmitted directly from the pump cylinder 11 to the space between the casing 33 and the liner 34 without passing through the milk can 21.

Operation

In operation, the pump 10 is started, creating a partial vacuum in the milk can 21. For best results this vacuum should be kept low, in general not over fourteen inches of mercury. After the desired pressure is attained in the milk can 21, the relief valve 28 opens on each subsequent vacuum stroke of the pump, admitting a small amount of air from the atmosphere, through the relief valve 28, which air is, in turn, drawn through the valve 23 and into the pump cylinder 11.

The teat cup may be adjusted on the teat as soon as there is sufficient vacuum in the line to hold it in place. The action of the machine then maintains the constant vacuum on the hose 39 and alternate pressure and vacuum on the outside of the liner 34.

The air drawn into each pump cylinder 11 on the suction stroke is expelled on the pressure stroke through both its valve 24 to the atmosphere and its nipple 43 to each of the two spaces between the casings 33 and the liners 34 connected with that cylinder. The latter air creates positive pressure within this space above atmospheric, which pressure is dependent upon the weight of the valve 24. This pressure may be varied by either adjusting the weight of the ball 24 or by weighting the ball with a spring similar to the spring 31.

The vacuum relief and the application of pressure within the space between the casing 33 and the liner 34 collapses the liner 34 in the manner shown in Fig. 1, and cuts off the vacuum from the animal's teat, while at the same time massaging the teat with an action similar to that of a natural calf milking.

On the downward or suction stroke of the piston, vacuum is created on the outside of the liner 34 so that the liner assumes its natural shape as shown in Fig. 2 and the vacuum in the line 39 sucks milk from the teat into the milk can 21.

Since cows usually have four teats four teat cups are provided on each machine and the interiors of all the liners 34 are connected to the one tubing 39.

It has been found that milking the four teats alternately or two at a time results in faster and more satisfactory milking. The present machine, has, therefore, two cylinders 11 each connected with a chamber 22 and a tube 42. Each of the tubes 42 is connected with two of the four teat cups, as shown in Fig. 7, so that as the pistons, which move in opposite directions, operate, the milking is alternated between the two pairs of teats.

Having thus described the invention it is realized that it is susceptible to various changes and modifications, and it is not desired to limit the invention to the precise form herein shown and described but only by the scope of the appended claims.

The invention is hereby claimed as follows:

1. A milking machine of the character described comprising, a reciprocating piston pump having two cylinders with pistons therein movable in opposite directions, a milk can, air conducting means connecting the interior of said milk can with both cylinders of said pump to enable said pump to exhaust the air from said milk can, a pair of teat cups each teat cup comprising a rigid casing and a flexible liner adapted to receive an animal's teat in the interior thereof, air conducting means joining the interior of said teat cups with the interior of said can to produce a constant suction within said liners, air conducting means connecting the space between one casing and its liner with one of said cylinders, and air conducting means connecting the space between the other casing and its liner with the other said cylinder whereby the spaces between the casings and the liners are subjected to alternate pressure and vacuum to effect milking of the teats alternately.

2. A milking machine of the character described comprising, a milk receiving can, a pump comprising a plurality of cylinders with a piston operable in each cylinder, air conducting means connecting each cylinder with the interior of said milk receiving can, an inlet valve to each cylinder situated in the air conducting means leading to that cylinder, means to actuate said pistons so that they withdraw air from said milk receiving can alternately, an exhaust valve for each of said cylinders, a plurality of teat cups, each teat cup comprising a rigid casing and a flexible liner within said casing adapted to receive an animal's teat in the interior thereof, air conducting means connecting the interior of said liners of said teat cups with the interior of said milk receiving can, air conducting means connecting the space between the liner and the casing of one teat cup with the interior of one cylinder, and air conducting means connecting the space between the liner and the casing of another teat cup with the interior of another cylinder.

3. A milking machine of the character described comprising, a milk receiving can, a pump comprising a plurality of cylinders with a piston operable in each cylinder, air conducting means connecting each cylinder with the interior of said milk receiving can, an inlet valve to each cylinder situated in the air conducting means leading to that cylinder, means to actuate said pistons so that they withdraw air from said milk receiving can alternately, means to limit the degree of vacuum within said milk receiving can, an exhaust valve for each of said cylinders, a plurality of teat cups, each teat cup comprising a rigid casing and a flexible liner within said casing adapted to receive an animal's teat in the interior thereof, air conducting means connecting the interior of said liners of said teat cups with the interior of said milk receiving can, air conducting means connecting the space between the liner and the casing of one teat cup with the interior of one cylinder, and air conducting means connecting the space between the liner and the casing of another teat cup with the interior of another cylinder.

4. A milking machine of the character described comprising, a milk receiving can, a pump comprising a plurality of cylinders with a piston operable in each cylinder, air conducting means connecting each cylinder with the interior of said milk receiving can, an inlet valve to each cylinder situated in the air conducting means leading to that cylinder, means to actuate said pistons so that they withdraw air from said milk receiving can alternately, means to equalize the degree of vacuum in said cylinders, an exhaust valve for each of said cylinders, a plurality of teat cups, each teat cup comprising a rigid casing and a flexible liner within said casing adapted to receive an animal's teat in the interior thereof, air conducting means connecting the interior of said liners of said teat cups with the interior of said milk receiving can, air conducting means connecting the space between the liner and the casing of one teat cup with the interior of one cylinder, and air conducting means connecting the space between the liner and the casing of another teat cup with the interior of another cylinder.

5. A milking machine of the character described comprising, a milk receiving can, a pulsation controller mounted on said milk receiving can, said pulsation controller comprising a plurality of chambers, each chamber having an intake passage leading from the interior of said milk receiving can into said chamber and an exhaust passage leading from said chamber to the atmosphere, valve means controlling each of said passages and an entrance passage leading into the chamber between said valves, a multiple cylinder reciprocating pump, a piston operable in each cylinder, air conducting means connecting each cylinder of said pump with one of said entrance passages, means to actuate said pistons to withdraw air from said milk receiving can alternately, a plurality of teat cups, each teat cup comprising a rigid casing and a flexible liner within said casing adapted to receive an animal's teat in the interior thereof, air conducting means connecting the interiors of said liners with the interior of said milk receiving can, air conducting means connecting the space between the liner and casing of one teat cup with the interior of one said cylinder, and air conducting means connecting the space between the liner and casing of another teat cup with the interior of another cylinder to effect alternate milking of the teats.

6. A milking machine of the character described comprising, a milk receiving can, a pulsation controller mounted on said milk receiving can, said pulsation controller comprising a plurality of chambers, each chamber having an intake passage leading from the interior of said milk receiving can into said chamber and an exhaust passage leading from said chamber to the atmosphere, valve means controlling each of said passages, an entrance passage leading into the chamber between said valves and a pressure relief valve in said controller adapted to admit air into said milk receiving can when a predetermined degree of vacuum is attained, a multiple cylinder reciprocating pump, a piston operable in each cylinder, air conducting means connecting each cylinder of said pump with one of said entrance passages, means to actuate said pistons to withdraw air from said milk receiving can alternately, a plurality of teat cups, each teat cup comprising a rigid casing and a flexible liner within said casing adapted to receive an animal's teat in the interior thereof, air conducting means connecting the interiors of said liners with the interior of said milk receiving can, air conducting means connecting the space between the liner and casing of one teat cup with the interior of one said cylinder, and air conducting means connecting the space between the liner and casing of another teat cup with the interior of another cylinder to effect alternate milking of the teats.

ENGLEBERT SHURTS.